United States Patent Office 2,738,947
Patented Mar. 20, 1956

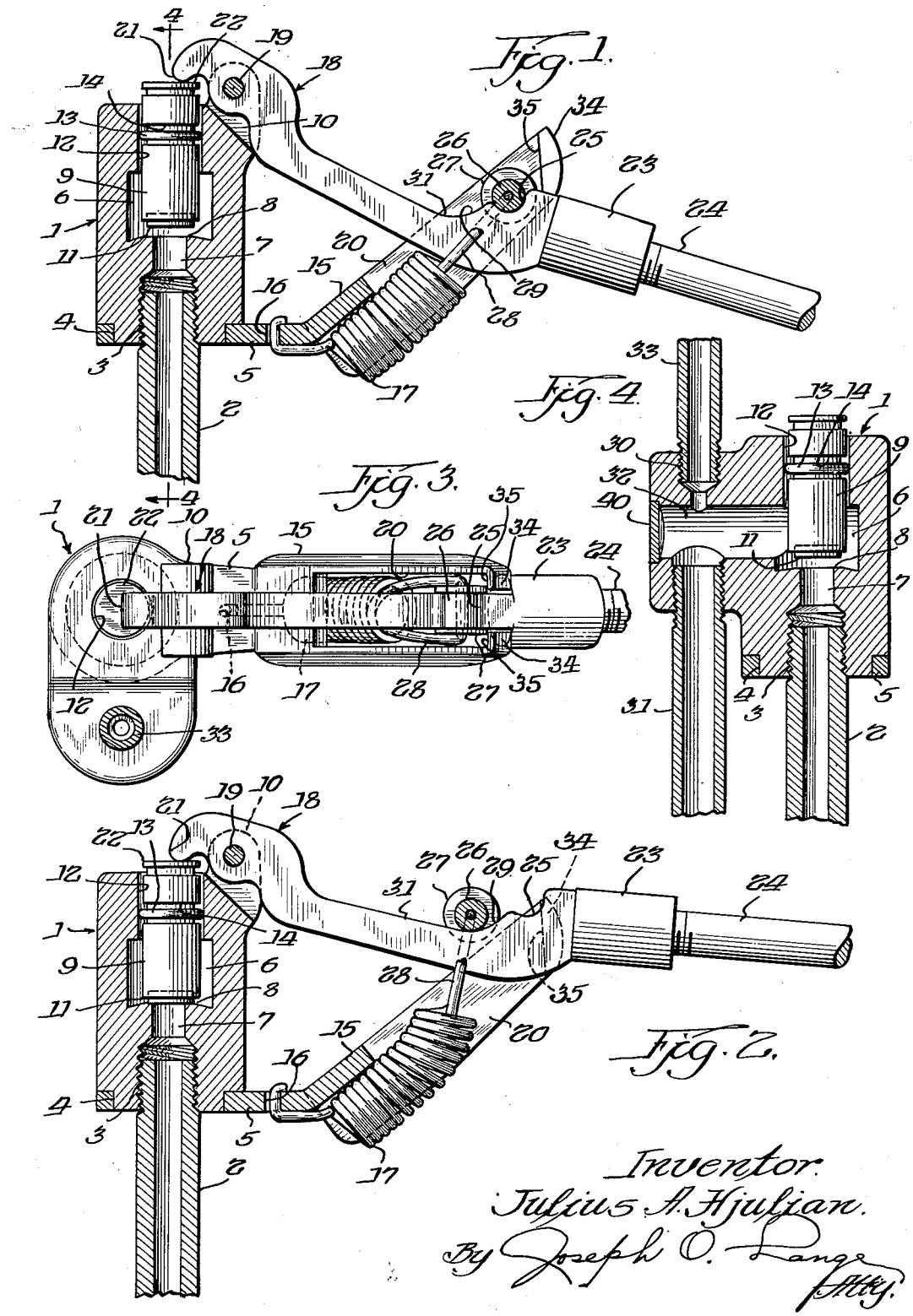

2,738,947

TANK FILLING VALVE

Julius A. Hjulian, Palos Heights, Ill., assignor to Crane Co., Chicago, Ill., a corporation of Illinois Application August 30, 1952, Serial No. 307,273

10 Claims. (Cl. 251—75)

This invention relates to a tank filling valve, more frequently known as a float controlled valve mechanism.

More particularly, it is concerned with a device in which the tank filling function is performed primarily by employing a valve structure having an automatic snap action float rod mechanism which prevents objectionable cutting or wire drawing at the valve seat.

A further important object is to provide for a tank filling means or the like in which a more quiet and rapid fill of the tank is obtained by virtue of using a casing structure in which the float operated valve is maintained in a substantially fully opened position during the entire tank filling period.

A further important object is to provide for a tank filling valve, in which after a predetermined amount of water has been obtained within the tank or reservoir a snap action mechanism functions to close the valve quickly and in a relatively cushioned manner, preferably by resilient means employed, from a substantially full open position.

Other important objects and advantages of the invention will become more readily apparent upon proceeding with a description of the device read in light of the accompanying drawings, in which Fig. 1 is a fragmentary sectional assembly view of a valve in open position which embodies my invention and is shown in a position when the tank is assumed to be empty.

Fig. 2 is a fragmentary sectional assembly view of the device described in connection with Fig. 1, in which the valve is closed and the tank is assumed to be in the filled position.

Fig. 3 is a fragmentary plan elevation of the device shown in Fig. 1.

Fig. 4 is a fragmentary sectional view taken on the line 4—4 of Fig. 1.

Similar reference numerals refer to similar parts throughout the several views.

Directing attention now to Fig. 1, a casing or body generally designated 1 is shown having an inlet supply conduit 2 attached thereto in fluid sealing relation as by means of the threads 3. Annularly disposed around the relieved portion 4 at the lowermost end of the casing, a bracket 5 is attached. For reasons hereinafter explained at greater length, the casing 1 is provided with a valve chamber 6, the inlet port thereof, as at 7, communicating with the fluid inlet conduit 2 as indicated and at the uppermost end thereof being provided with an annular seat 8 for effecting a fluid sealing contact with the reciprocably movable combined plunger and closure member 9 preferably provided at the lowermost end portion with a fluid sealing disc or seat contact member 11, the plunger being suitably received at the upper portion of the casing 1 and guided therewithin in the chamber defined by the surface 12. The plunger preferably has a loosely fitted sealing ring 13 receivable within the annular groove 14, the sealing ring making the usual fluid sealing contact with the annular wall 12 in the customary and well-known manner. Thus, it will be clear that fluid pressure within the passage 7 and in the chamber 6 will normally tend to keep the valve disc 11 off the seat 8 which condition is controlled by means of the actuating mechanism hereinafter immediately described.

Referring to the bracket member 5 which is fixedly mounted on the casing 1, it will be noted that the said bracket has an inclined and extended portion 15, preferably bifurcated as at 20, the lowermost end portion of which is preferably apertured as at 16 to receive the free and hooked end of the coil spring 17 as indicated.

At the upper end portion of the casing a pivotally mounted valve actuating lever generally designated 18 is positioned, pivoting, as shown, on the bifurcated lug 10 and around the pin or shaft 19, the lever having a toe portion 21 normally bearing against the top surface 22 of the plunger-closure member 9 to limit the upward movement of the latter member. At the opposite end portion of the lever generally designated 18 an integral boss 23 is provided which is tapped to receive the float rod 24. The latter is suitably connected to a float ball (not shown). The latter member rises and falls in accordance with the variations in the level of water as the latter fluid enters into and is discharged from the tank during the normal course of operation, say in connection with a plumbing fixture or the like.

In order to impart to the lever 18 the desired delayed action advantages previously referred to, the lever 18 is provided with a curved recess or notch as at 25 for receiving the roller 26, journally mounted on the looped end 28 of the spring 17, and upon which roller the guiding flanges 27 are provided, oppositely disposed as illustrated. It will be noted that the notch 25 is specially formed so as to receive the said roller 26 and to hold it in an indicated or lower position within the filling water of the tank until a predetermined water level has been reached therewithin, which level is generally established at the point in which the tank has been suitably filled by virtue of the valve member 9 being open or off of the seat 8 as shown more clearly in Fig. 1. However, immediately upon the predetermined water level being attained within the tank, the spring 17 being attached to the roller 26 under the tension exerted and by means of the looped extension 28 will draw the roller journalled thereon from the rounded and notched portion 25 to the position shown in Fig. 2, the roller descending on the lever incline 29 to move to the straight-way location 31 indicated in Fig. 2. The latter spring action will occur after the periphery of the roller flanges 27 have contacted the surfaces 35 of the inturned portions or wings 34 of the fixedly mounted bracket 15. The latter mentioned contact will nudge the roller 26 from the recess 25 and start it down the incline 29 to permit the lever to pivotally rise and close the valve as hereinafter described.

Thus, it should be clear that upon the roller 26 reaching the said position indicated in the Fig. 2, the lever under the influence of the float in the tank water will pivotally rise quickly to a position more substantially approaching a horizontal plane as shown and thus the toe 21 of the lever 18 will bear against the upper surface 22 of the valve plunger closure 9 and cause the latter member to be forced to its seat to shut off the inlet supply 2.

As shown in Fig. 4, the body or casing 1 is provided with the discharge outlet 32, the entering water passing from the inlet 7 into the cross connecting chamber 32 will discharge into the conduit 31, with a predetermined proportion thereof usually provided in plumbing devices to allow for dispersion of water through the outlet conduit 33 for resealing purposes and which is attached at 30 to the casing 1. A plug 40 defines one end limit of the chamber 32.

The operation of the device of my invention is as follows: As the water level within a tank (not shown) falls to a certain point, the lever 18 will pivotally drop to the position indicated in Fig. 1 sufficiently to allow the roller 26 positioned on the end of the trip rod spring 17 to engage the lever stop or notch 25 thereby to hold and maintain the valve in the substantially fully open position as shown in Fig. 1. It will be noted that in the latter position the piston or plunger member 9 is forced off of its casing seat 8 by water pressure, as previously described, to allow for the outer end 22 of the plunger member 9 to bear against the lever toe portion 21 as shown.

As the tank fills with water and the lever 18 under the restraint of the spring 17 will remain substantially stationary notwithstanding the partial immersion of the float (not shown) and the spring 17 will stretch slightly. The roller 26 attached to the spring 17 is in the position illustrated and as the flange portions 27 of the roller 26 contact the inner extending wing members 34 on the bracket at the surfaces 35 and the roller 26 is forced from its engage position in the recess 25. The trip rod then springs pivotally upwardly rapidly as it is released due to the fluid pressure exerted on the said submerged float attached to the said rod lever 24.

In summary, it will be noted that the trip rod 18 actually has three functions to perform:

First, to maintain the float partially submerged in the water of tank until sufficient pressure has been obtained to close the valve 9 when the spring stretches, permitting the trip rod release.

Two, as the roller 26 attached to the spring member 17 through its flanges 27 comes in contact with the wing shaped surfaces 35 on the end of the bracket 15 tension is created in a generally horizontal direction relative to the float to overcome the action of the spring as the trip rod is released and eliminating the splash and noise of the float when it is forced by its buoyancy to the surface of the water within the tank.

Three, after the snap action release of the roller 26 takes place, the spring 17, returning immediately to its collapsed form (see Fig. 2), also slows down or decelerates the performance of the snap action to a substantial degree near the end of the roller movement, creating a cushioning effect on the piston 9 to close the inlet orifice 7 by reason of the curvature 29 of the incline and upon which the spring roller 26 is supported in its movement.

It will, of course, be understood that only a preferred form of the invention has been shown and described in connection with the specification, but it should be obvious that a number of different modifications may be employed within the purview of this invention, and it is desired therefore to be limited only by the claims appended hereto.

I claim:

1. In a filling valve for tanks or the like, the combination of a casing having an inlet and an outlet, a recriprocably movable closure member within said casing, the said casing being apertured at an upper end thereof and in the valve open position allowing for a portion of said closure member to project through the aperture of said casing, a pivotally mounted lever for actuating said closure member, the said lever on an upper portion being provided with a relieved surface and having an end portion adjacent the aperture of the casing for contacting the projecting portion of the said closure member to actuate the latter member, a bracket fixedly mounted relative to the said casing, the said lever being resiliently movable relative to the said bracket, the relieved surface of the lever being on the arm portion thereof and on the opposite side of the lever pivotal mounting relative to the lever end portion contacting the projecting portion of the said closure member, a spring member with one end thereof fixedly attached relative to the said lever, the other end of the said spring having a portion normally nested supported within the relieved surface of the said lever to resiliently hold the latter member in retracted position relative to the casing, the said latter spring portion having means for contacting the said bracket to effect displacement of said spring portion whereby upon predetermined pivotal movement of said lever the said spring portion contacts the said bracket and the spring portion is subsequently forced from its nested position within the relieved surface of the said lever to release the latter means thereby to close the valve inlet.

2. In a float controlled valve or the like, a valve casing with an inlet and an outlet, a reciprocably movable closure member within said casing, the inlet of said casing being below said closure member, the upper portion of the said closure member projecting through said casing, a pivotally mounted lever on the said casing normally contacting the upper portion of the said closure member, a bracket cooperating with the said lever, a roller mounted for movement from a relieved portion of the said lever, resilient means normally holding the said roller within said relieved portion of the lever, the said relieved portion being open at a side opposite the pivotal mounting of the lever, the said bracket coacting with the said roller and lever, the said roller moving out of the relieved portion of the said lever at the said open side upon predetermined contact of the roller with said bracket and concurrent pivotal movement of the lever upwardly.

3. In a filling valve for tanks or the like, the combination of a casing having in inlet and an outlet, a reciprocably movable closure member within said casing positioned above said inlet, the said casing being apertured to permit, in the open position of said closure member, for a portion thereof to project through said casing, a pivotally mounted lever, the said lever being provided with a notched upper surface and having an end portion thereof beyond the pivotal mounting of the lever, the said lever contacting the projecting portion of the said closure member above said casing and beyond said lever pivotal mounting to actuate said closure member, the said casing having a bracket fixedly mounted thereon, the said lever being pivotally movable relative to the said casing, the said notched upper surface of the lever being on the opposite side of the pivotal mounting relative to the end portion thereof contacting the said closure member, resilient means cooperating with the said bracket, the other end of the said resilient means having a roller member normally bearing under tension of said resilient means against the notched upper surface of the said lever to hold the latter member in retracted position relative to the casing, the said lever being movable upwardly to close the valve when the tension of the resilient means is released whereby upon predetermined movement of said lever the said roller is forced by contact with said bracket from its position within the notched portion of the said lever to release and thereby allow the said lever to move pivotally upward to close the valve inlet.

4. In a valve for filling tanks or the like, the combination of a casing having in inlet and an outlet, a reciprocably movable plunger-type closure member movable within said casing and positioned above said inlet, the said casing being apertured to permit, in the open position of said closure member, for the plunger portion thereof to project through said casing, a pivotally mounted lever actuating said closure member, the said lever having a recessed upper surface and an end portion extending beyond the pivotal mounting thereof abutting the plunger portion of the said closure member, the said casing having a bracket fixedly mounted thereon, the said lever being attached to the said casing, a spring member cooperating with the said bracket, one end of the said spring having a roller member normally bearing under spring tension against the recessed upper surface of the said lever to hold the latter member in a retracted position relative to the said casing, the recessed upper surface of the lever being on the opposite side of the pivotal mounting relative to the end portion abutting the said closure member, the pivotally mounted lever being movable upwardly to close the valve when the spring tension is released, whereby upon predetermined movement of said lever the said roller is caused to move from its position within the recessed portion of the said lever by its contact with the said bracket to allow the said lever to move so as to close the valve inlet.

5. In a float controlled valve or the like, a valve casing with an inlet and an outlet, a reciprocably movable closure member within said casing, the inlet of said casing being below said closure member, the upper portion of the said closure member projecting through an opening in said casing, a pivotally mounted lever on the said casing having an end portion normally contacting the upper portion of the said closure member, a bracket cooperating with said lever to limit the movement of the latter member, a roller predeterminately contacting said bracket and mounted on a relieved portion of the said lever, the latter relieved portion being on the opposite side of the pivotal lever mounting relative to the end portion thereof contacting the said closure member, resilient means carried by the said bracket and normally holding the said roller within said relieved portion of the lever, the said roller being carried by the said resilient means and moving out of the relieved portion of the said lever when contacting said bracket upon predetermined movement of the said lever.

6. In a float controlled valve or the like, a valve casing with an inlet and an outlet, a reciprocally movable closure member within the said casing, the inlet of said casing being below said closure member, the upper portion of the said closure member projecting through an opening in said casing, a pivotally mounted lever on the said casing having an end beyond the pivot of the lever normally contacting the upper portion of the said closure member to limit the movement of the closure member outwardly relative to said casing, a bracket attached to the casing and cooperating with the said lever to limit the pivotal movement of the latter member, a roller mounted on a relieved portion of the said lever predeterminately contacting the said bracket, the latter relieved portion being on the opposite side of the pivotal lever mounting relative to the end thereof contacting the said closure member, resilient means on the said bracket normally drawing the said roller toward and within said relieved portion of the lever, the said lever being movable upwardly to close the valve when the tension of the resilient means is released, the said roller moving out of the relieved portion of the said lever when contacting said bracket upon predetermined pivotal movement of the lever upwardly and said release of the resilient means to allow the said lever to continue in the latter path.

7. In a valve for filling tanks or the like, the combination of a casing having an inlet and an outlet, a reciprocably movable closure member within said casing positioned above said inlet, the said casing being apertured to permit, in the open position of said closure member, for a portion thereof to project through said casing, a pivotally mounted lever actuating said closure member and with a notched upper surface thereon and having a toe portion on one side of the pivotal mounting of the lever, said toe portion contacting the projecting portion of the said closure member, the said casing having a bracket fixedly mounted thereon, the said lever being resiliently attached to the said bracket, the notched upper surface being in the arm of the lever and on the opposite side of the pivotal mounting relative to the said toe portion which actuates the said closure member, a spring member with one end attached to the said bracket, the other end of the said spring having roller means normally bearing under spring tension against the notched upper surface of the said lever to hold the latter member in a retracted position relative to the casing, the said lever being pivotally movable upwardly to close the valve when the tension of the spring member is released, the said roller means having projecting means cooperating with the said bracket whereby upon predetermined movement of said lever the said roller means is forced by contact with the said bracket means from its position within the notched portion of the said lever to release and to allow the said lever to move pivotally upward to close the valve inlet.

8. In a valve for filling tanks or the like, the combination of a casing having an inlet and an outlet, a reciprocably movable closure member within the said casing, the casing being apertured to permit, in the open position of said closure member, for a cylindrical portion thereof to project through said casing, a pivotally mounted lever on the casing actuating said closure member and with a notched upper surface and having a toe portion on one side of the pivotal mounting contacting the projecting portion of the said closure member to effect said actuation, the said casing having a bracket fixedly mounted thereon, the said lever being resiliently connected to the said bracket, the notched upper surface of the lever being on the arm portion thereof and on the opposite side of the lever pivotal mounting with relation to the toe portion contacting the said closure member, a spring member with one end attached to the said bracket, the other end of the said spring having a flanged roller member normally bearing under spring tension against the notched upper surface of the said lever to hold the latter member in predetermined retracted position relative to the said casing, the said lever being pivotally movable upwardly to close the valve when the spring tension is released, the flanges of said roller member upon predetermined pivotal movement of said lever and said release of the spring tension contacting the said bracket whereby the said roller member is moved by the bracket and subsequently is dislodged from its notched position on the said lever to release and to allow the said latter member to move pivotally upward to close the valve inlet.

9. In a float controlled valve or the like, a valve casing having an inlet and an outlet, a reciprocably movable plunger-like closure member within the said casing, the inlet of said casing being below said closure member, the upper portion of the said closure member being guided within and having a portion projecting through said casing, a pivotally mounted lever on the said casing normally contacting an upper surface on the said projecting portion of the said closure member and having thereon an upper inclined surface, a bracket cooperating with the said lever, a roller mounted on a relieved portion of the said lever for movement on the upper inclined surface, resilient means normally holding the said roller within said relieved portion of the lever preliminary to movement of the roller on the inclined surface, the said bracket having a surface portion cooperating with the said roller, the said roller having a projecting portion for engagement with the surface portion of the said bracket for predeterminately displacing and effecting movement of the roller out of the relieved portion of the said lever upon occurrence of predetermined pivotal movement of the lever in an upward direction.

10. In a float controlled valve or the like, a valve casing with an inlet and an outlet, a reciprocably movable closure member within and projecting through said casing, the upper portion of the said closure member being guided within said casing, a pivotally mounted lever on the said casing normally contacting an upper surface portion of the said closure member projecting through said casing, a fixedly mounted bracket being bifurcated to receive therebetween a portion of the said lever, roller means mounted on an upper relieved surface of the said lever predeterminately disengageable from the latter relieved surface, resilient means normally maintaining the said roller means within the said relieved surface of the lever, the said pivotally mounted lever being movable upwardly to close the valve when the tension of said resilient means is released, the said roller mounted means having a portion cooperating with a surface on the said bracket for deflection by the latter surface and thereby being nudged out of the relieved surface of the said lever upon the occurrence of predetermined transverse movement of the lever relative to the said bracket to effect said disengagement of said roller means and to permit accelerated closing of the valve.

References Cited in the file of this patent

UNITED STATES PATENTS

| | | |
|---|---|---|
| 1,705,367 | Kennedy | Mar. 12, 1929 |
| 2,095,485 | Bassett | Oct. 12, 1937 |
| 2,307,115 | Deibel | Jan. 5, 1943 |
| 2,504,022 | Hohner | Apr. 11, 1950 |